(12) United States Patent
Rosales

(10) Patent No.: US 12,351,126 B1
(45) Date of Patent: Jul. 8, 2025

(54) ALARM SYSTEM AND METHOD FOR DETECTING A REMOVAL OF A CATALYTIC CONVERTER OR OTHER ITEM

(71) Applicant: David Rosales, Las Vegas, NV (US)

(72) Inventor: David Rosales, Las Vegas, NV (US)

(*) Notice: Subject to any disclaimer, the term of this patent is extended or adjusted under 35 U.S.C. 154(b) by 97 days.

(21) Appl. No.: 18/485,393

(22) Filed: Oct. 12, 2023

Related U.S. Application Data

(60) Provisional application No. 63/415,885, filed on Oct. 13, 2022.

(51) Int. Cl.
*B60R 25/10* (2013.01)
*F01N 11/00* (2006.01)
*B60R 25/40* (2013.01)

(52) U.S. Cl.
CPC ...... *B60R 25/1001* (2013.01); *B60R 25/1004* (2013.01); *F01N 11/00* (2013.01); *B60R 25/403* (2013.01); *B60R 2325/105* (2013.01); *F01N 2260/22* (2013.01)

(58) Field of Classification Search
CPC ........... B60R 25/1001; B60R 25/1004; B60R 25/403; B60R 2325/105; F01N 11/00; F01N 2260/22
See application file for complete search history.

(56) References Cited

U.S. PATENT DOCUMENTS

| | | | | |
|---|---|---|---|---|
| 3,594,770 A | * | 7/1971 | Ham | G08B 13/126 174/105 R |
| 3,634,845 A | * | 1/1972 | Colman | G08B 13/04 340/508 |
| 3,813,663 A | * | 5/1974 | Perkins | B60R 25/1003 70/DIG. 49 |
| 3,825,918 A | * | 7/1974 | Laidlaw, Jr. | G08B 13/04 109/21 |
| 3,952,295 A | * | 4/1976 | Luisada | B65D 88/528 206/459.1 |
| 4,580,062 A | * | 4/1986 | MacLaughlin | G08B 13/08 307/328 |
| 5,027,397 A | * | 6/1991 | Double | H01L 23/576 713/194 |
| 5,298,884 A | * | 3/1994 | Gilmore | G08B 21/22 340/8.1 |
| 6,441,733 B1 | * | 8/2002 | Unterschultz | G08B 29/08 340/572.8 |

(Continued)

*Primary Examiner* — Nay Tun

(74) *Attorney, Agent, or Firm* — John Rizvi; John Rizvi, P.A.—The Patent Professor®

(57) ABSTRACT

The present invention is directed to an alarm system and method for activating an alarm in the event of an attempt to tamper with and/or remove an automobile's catalytic converter or other mechanical part or item. The alarm system may include a controller, one or more pairs of electrically conductive wires, and an alarm emitter. The controller may be configured to monitor a respective resistance across each pair of electrically conductive wires, and to activate the alarm emitter to emit an alarm when the monitored resistance is greater than a first predetermined value or less than a second predetermined value, wherein the first and second predetermined values are greater and less than the resistance of a respective resistor at the pair of electrically conductive wires, and may be indicative of an open circuit and a short circuit, respectively.

17 Claims, 7 Drawing Sheets

(56) References Cited

U.S. PATENT DOCUMENTS

| | | | |
|---|---|---|---|
| 6,727,817 B2* | 4/2004 | Maloney | G08B 13/2417 |
| | | | 340/568.2 |
| 7,256,692 B2* | 8/2007 | Vatsaas | G08B 13/126 |
| | | | 307/147 |
| 8,002,232 B2 | 8/2011 | Meislahn | |
| 8,453,784 B2 | 6/2013 | Dusa, II | |
| 9,227,594 B2* | 1/2016 | Reed | B60R 25/1004 |
| 9,631,541 B2* | 4/2017 | Van Wiemeersch | F01N 13/00 |
| 10,725,077 B2* | 7/2020 | Verhoeven | G06K 19/0716 |
| 11,893,146 B2* | 2/2024 | Cherukuri | G01R 27/04 |
| 11,981,285 B2* | 5/2024 | White | G08B 29/12 |
| 2011/0036130 A1* | 2/2011 | Hisler | F01N 3/28 |
| | | | 70/57.1 |
| 2014/0104048 A1* | 4/2014 | De Kock | G08B 13/1654 |
| | | | 340/429 |
| 2014/0176320 A1 | 6/2014 | Reed et al. | |
| 2014/0178253 A1 | 6/2014 | Van Wiemeersch et al. | |
| 2015/0123777 A1 | 5/2015 | Potter | |
| 2015/0192054 A1* | 7/2015 | Van Wiemeersch | |
| | | | F01N 13/008 |
| | | | 701/114 |

\* cited by examiner

ALARM SYSTEM AND METHOD FOR DETECTING A REMOVAL OF A CATALYTIC CONVERTER OR OTHER ITEM

CROSS-REFERENCE TO RELATED APPLICATION

This application claims the benefit of U.S. Provisional Patent Application No. 63/415,885, filed on Oct. 13, 2022, which is incorporated by reference herein in its entirety.

FIELD OF THE INVENTION

The present invention relates generally to alarm systems and methods, and more particularly, to a tamper-proof alarm system and method for deterring against theft of an automobile's catalytic converter or other mechanical part or item, and/or activating an alarm in the event of an attempt to tamper with and/or remove an automobile's catalytic converter or other mechanical part or item.

BACKGROUND OF THE INVENTION

A catalytic converter is a device that uses a catalyst to convert pollutants from an automobile engine's exhaust (e.g., non-combusted hydrocarbon fuels, carbon monoxide formed during combustion, and nitrogen oxides created when the heat in the automobile's engine causes nitrogen in the air to combine with oxygen) into harmless or less harmful compounds. Specifically, a catalytic converter is engineered to convert. (i) carbon monoxide, which is a deadly gas, to carbon dioxide; (ii) hydrocarbons, which can be highly carcinogenic and toxic when introduced into the environment, to carbon dioxide and water; and (iii) nitrous oxides, which can also lead to the formation of smog and acid rain, to nitrogen and oxygen.

In a catalytic converter, the catalysts are precious or rare metals—platinum, palladium, and/or rhodium—that are coated onto a ceramic honeycomb or ceramic beads that are housed in a muffler-like device attached to an automobile's engine exhaust pipe. Because catalytic converters contain these precious or rare metals, these devices have economic value even as scrap. According to J.D. Power (jdpower.com), data from 2020 showed that the most expensive catalytic converter belonged to the Ferrari F430, which requires two converters, each with a price of $3,770 for a total of $7,540 before labor costs. Additionally, J.D. Power reports that even ordinary, less exotic automobiles such as the Dodge Ram 2500 or the Ford F-250, were equipped with catalytic converters priced at $3,460 and.$2,804, respectively. The average price of a catalytic converter, according to J.D. Power, ranged from $800 to $1,200, depending on the vehicle's make and model. In general, the larger the engine, the more expensive the converter, as more catalytic metals would be required to handle the flow of the exhaust.

Because the three precious metals that are commonly used in catalytic converters—platinum, palladium, and rhodium—sell for high prices that drive up the cost of catalytic converters, these devices are an appealing target for theft. According to Cars.com, platinum sold for about $1,100 per ounce in 2021, while palladium sold for nearly $2,400 per ounce in 2021. Rhodium had a 2022 value exceeding $14,000 per ounce. According to Car and Driver (caranddriver.com), there were 18,026 catalytic converters that were reported stolen in California alone in 2021.

Various efforts to curb catalytic converter theft have been implemented and even legislated. In September 2022, California's governor signed legislation that was intended to make it harder for catalytic-converter thieves to get away with selling them, according to Car and Driver. This new law requires sellers of these anti-pollution devices to prove they obtained them legally or otherwise be subject to penalties. Additionally, scrap-metal recyclers or dealers are also required to keep records showing where they obtained the catalytic converters. For a recycler, the legislation attaches a $1,000 fine for a first conviction and $2,000 for a second, as well as a temporary suspension from operating as a recycler. A written agreement with the seller, records of the amount paid and number of catalytic converters purchased, and descriptive information such as unique ID numbers or VINs etched into the parts are required. Recyclers are required to retain records for at least two years. It is uncertain, however, whether the legislation will have any effect on thieves, who disregard the law in the first place, and what impact, if any, the legislation will have on the underground market or sales outside of California, such as sales to fill demand in foreign countries or for the recovered metals themselves, which will not have unique IDs on them and which can then be used to manufacture non-branded catalytic converters that may be sold or brought in to the United States.

Other alarm systems designed to function against the theft of catalytic converters have been disclosed previously. For example, one known catalytic converter protection system includes a controller, a catalytic converter having a housing, and a shorting element that has two terminals and is coupled to the housing. The system also includes a connector having an internal resistor. The connector is electrically coupled to the controller and the two terminals. The controller monitors the resistance of the internal resistor to determine continuity between the connector and the shorting element.

Another known system is disclosed as a proximity-based catalytic converter protection system for a vehicle that includes a controller, and a catalytic converter, both located in the vehicle. The protection system further includes a pair of electrodes that are electrically coupled to the controller and located in proximity to the converter. The controller monitors capacitance between the electrodes to detect movement external to the vehicle near the converter.

Another known system provides an arrangement including a metal cage surrounding a catalytic converter, the cage being attached to the underside of the vehicle. An electronic tamper-detecting device including a motion detector and/or a vibration sensor is attached to an inner surface of the cage and sets off an alarm if someone tampers with the cage. The tamper-detecting device is armed and disarmed remotely by use of a key fob.

Furthermore, another known anti-theft system for protecting a vehicle exhaust component comprises: a sensor configured to monitor vibrations associated with a vehicle exhaust system; and a controller arranged to monitor a signal from the sensor, wherein the controller is configured to generate an alarm event if the signal from the sensor includes characteristics indicative of vibrations associated with an attempted theft of the vehicle exhaust component.

Despite these known systems, there remains a need in the art for an effective and reliable tamper-proof alarm system for an automobile's catalytic converter system.

There also remains a need in the art to provide a catalytic converter alarm system that can be retrofitted on a vehicle's catalytic converter in service centers such as muffler repair shops.

There also remains a need in the art to provide a catalytic converter alarm system that triggers an alarm when someone attempts to tamper with the alarm system or attempts to remove the catalytic converter.

One or more of the foregoing needs, as well as other needs, may be fulfilled by the invention described below.

SUMMARY OF THE INVENTION

The present invention is directed to an alarm system for a catalytic converter in an automobile engine's exhaust system, or for another valuable component, system, or item. The alarm system may be configured to activate an audible and/or visual alarm when it senses an attempt to: (i) tamper with or disable the alarm system itself (such as by cutting the wires or by bypassing the wires); and/or (ii) tamper with and/or remove the catalytic converter or other item from its initial location (e.g., the automobile engine's exhaust system). The alarm system may include: a controller, which may be configured to monitor voltage and/or resistance across two heat-resistant electroconductive wires provided with a resistor that may be disposed on an at least a portion of an exterior surface of the catalytic converter or other item; and an alarm. When the controller receives a signal that the voltage and/or resistance falls outside certain programmed set point range(s), an audible and/or visual alarm is activated, thereby alerting the owner of the automobile or any individual in the vicinity, which would disrupt any attempt to tamper with the alarm system itself and/or tamper with and/or remove the catalytic converter or other item being monitored by the alarm system. The alarm system may be powered by the automobile's battery. The alarm system of the present invention may conveniently be installed at after-market service centers, although it may also be installed as standard or optional equipment at the time an automobile is manufactured.

In an implementation of the invention, an alarm system for monitoring one or more items may include a controller, one or more pairs of electrically conductive wires, and an alarm emitter. Each pair of electrically conductive wires may include a respective, first electrically conductive wire and a respective, second electrically conductive wire. The first and second electrically conductive wires may each include a respective, far end and a respective, near end. The far ends of the first and second electrically conductive wires of each pair of electrically conductive wires may be connected to each other via a respective resistor. The alarm emitter may be configured to emit an alarm. The one or more pairs of electrically conductive wires may be wrapped around one or more items, such as catalytic converter and engine exhaust tubing. The near ends of the first and second electrically conductive wires of each pair of electrically conductive wires may be operatively connected to the controller. The controller may be configured to execute the steps of: monitoring a respective resistance across each pair of electrically conductive wires, and activating the alarm emitter to emit the alarm when said respective resistance is greater than a first predetermined value or less than a second predetermined value, wherein the first and second predetermined values are greater and less than the resistance of the respective resistor of said each pair of electrically conductive wires, respectively.

In a second aspect, the alarm system may be configured to activate or trigger the alarm when the wires are cut.

In another aspect, the alarm may be triggered when an attempt is made to bypass the wires by jumping a point before the catalytic converter.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "top", "bottom", "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary, or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward an alarm system 100 for a catalytic converter 106 in an automobile 102 engine's exhaust system that also includes piping 108.

Figure 1:
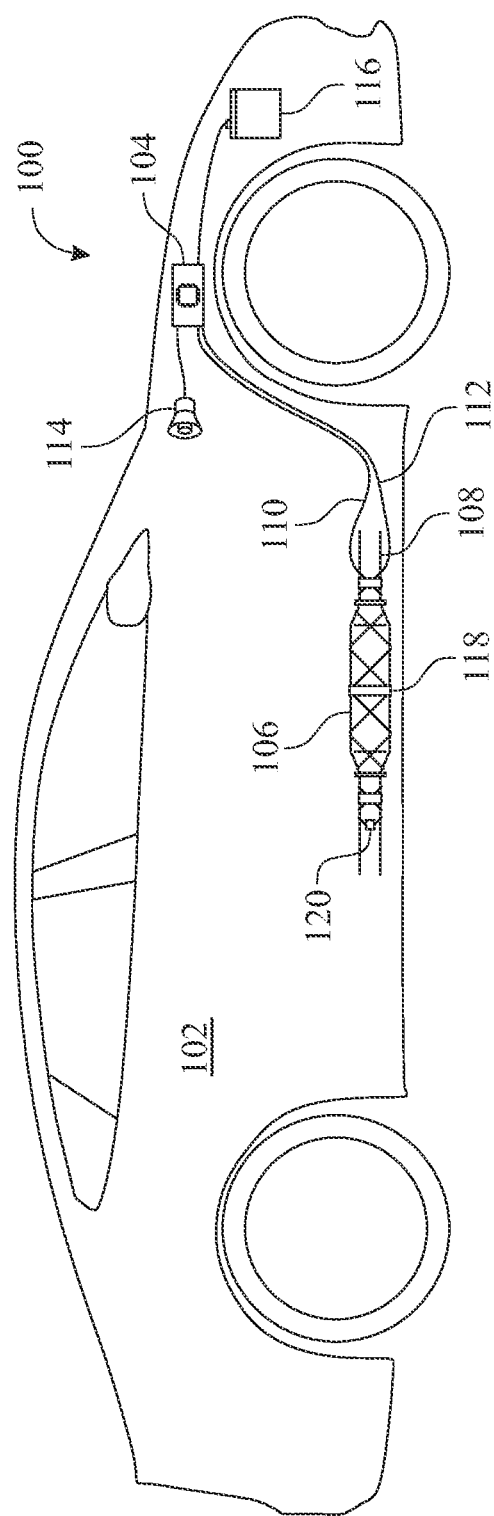
FIG. 1 presents a side view of an automobile equipped with an alarm system for a catalytic converter according to an embodiment of the present invention.
Figure 2:
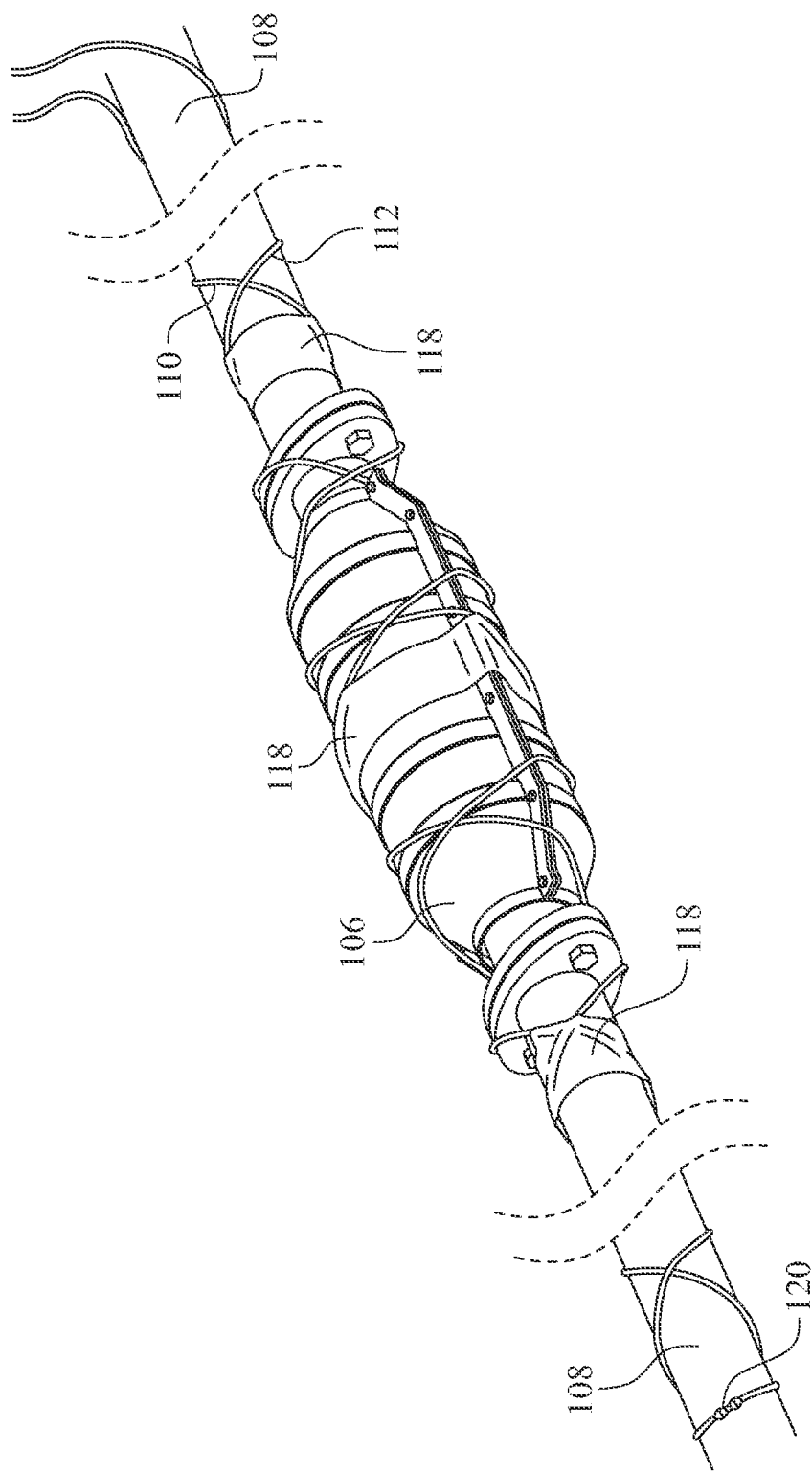
FIG. 2 presents an isometric view of the two heat-resistant, electroconductive wires, with respective ends on one side that are connected to each other via a resistor, installed on the automobile's catalytic converter and the automobile engine exhaust piping according to an embodiment of the present invention.
Figure 6:
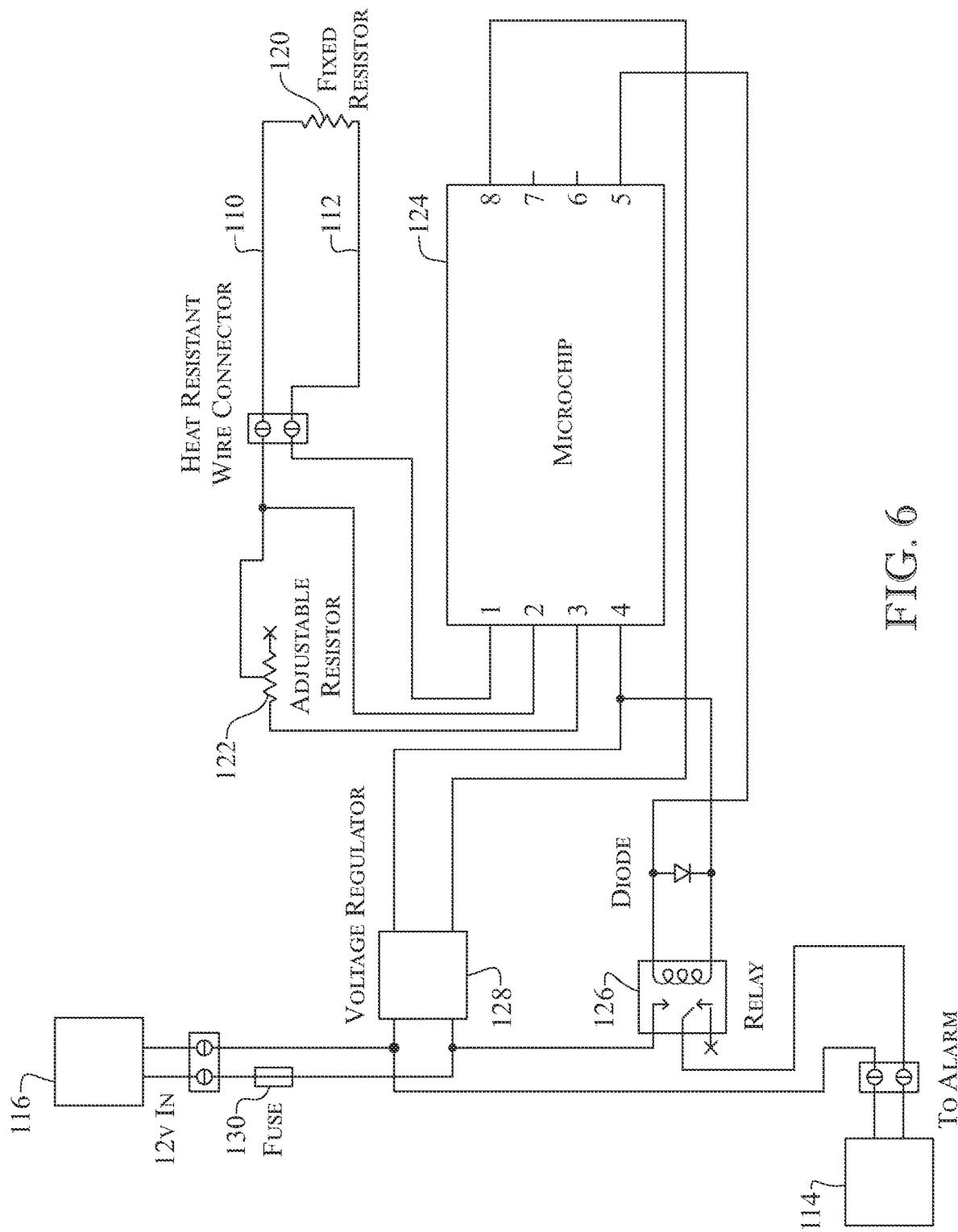
FIG. 6 presents an electrical schematic of a catalytic converter alarm system in accordance with an embodiment of the present invention.

Referring initially to FIGS. 1 and 2, an alarm system 100 for a catalytic converter 106 in an engine exhaust system of an automobile, the engine exhaust system also including piping 108, is illustrated according to an embodiment of the present invention. The alarm system 100 can comprise: (a) a controller 104 in the form of a printed circuit board with a microchip; (b) a pair of heat-resistant, electroconductive wires 110 and 112 wrapped around at least a portion of the catalytic converter 106 and at least a portion of the automobile's engine exhaust system piping 108 (e.g., in a criss-cross configuration); and (c) an alarm emitter, hereinafter referred to as alarm 114 (e.g., a siren or speaker that can emit a loud audible alarm) that is controlled and activated by the controller 104 depending on the sensed voltage and/or resistance conditions. The pair of heat-resistant, electroconductive wires 110 and 112 may each have respective ends that are connected to each other on one side via a resistor 120, as shown in FIGS. 1 and 2, that facilitates monitoring of resistance and prevents tampering by cutting or by bypassing. The other respective ends of the heat-resistant, electroconductive wires 110 and 112 on the other side are operatively connected to the controller 104 via a heat-resistant wire connector, as schematically shown in FIG. 6. As shown in FIG. 1 and schematically in FIG. 6, the alarm system 100 may be electrically connected to and powered by a battery 116 of the automobile 102. The battery 116, together with the controller 104 and alarm 114, may be securely located under the hood of the automobile 102.

Further details as to the configuration of the heat-resistant, electroconductive wires 110 and 112 are shown in FIG. 2. As may be seen in this figure, the heat-resistant, electroconductive wires 110 and 112 may surround or wrap around at least a portion of the catalytic converter 106 and at least a portion of the engine exhaust system piping 108 of the automobile 102 in a criss-cross arrangement. As described above, the respective ends on one side of the heat-resistant, electroconductive wires 110 and 112 are connected to each other via a resistor 120. In one embodiment, the pair of criss-crossing heat-resistant, electroconductive wires 110 and 112 may be arranged from a point beyond the mounting point of the engine's exhaust system piping 108 (e.g., about 3 feet) towards the rear of the automobile inclusive of the catalytic converter 106 and additional piping 108 towards the rear of the automobile 102. In some embodiments, the resistor 120 is preferably positioned opposite to a first hanger securing the catalytic converter to the vehicle chassis.

As further shown in FIGS. 1 and 2, heat-resistant tapes 118 may be used for securing the heat-resistant, electroconductive wires 110 and 112 in place. The heat-resistant tapes 118 may extend over the electroconductive wires 110 and 112 and the underlying structure on which the electroconductive wires are wrapped (e.g., the catalytic converter 106 and the engine exhaust system piping 108), thereby securing the heat-resistant tapes 118 to the underlying, catalytic converter 106 or engine exhaust system piping 108. In one embodiment, the heat-resistant tapes 118 may be silver duct tape. The heat-resistant tapes 118 may be spaced apart by a suitable distance, e.g., about 1 foot apart along the exhaust system including piping 108 and catalytic converter 106 of the automobile 102. Alternatively or additionally, a series of locking hose clamps may be used to secure the heat-resistant, electroconductive wires 110 and 112.

As stated above, in one embodiment of the invention, one end of each of the at least two heat-conductive, electroconductive wires 110 and 112 may be connected to each other via a resistor 120 as shown in FIGS. 1 and 2 and schematically in FIG. 6 to prevent tampering by cutting or by bypassing (or jumping). A potentiometer, variable resistor, or adjustable resistor, hereinafter referred to as adjustable resistor 122, shown in FIG. 6, may be used to fine tune the alarm set points. This may be accomplished by adjusting the adjustable resistor 122 to a middle spot such that the alarm is not in an activated state. The adjustable resistor 122, as shown in the electrical schematic as depicted in FIG. 6, compensates for the total resistance in the heat-resistant, electroconductive wires 110 and 112 plus the known fixed resistance in resistor 120.

The "brain" or processor unit 124 of the controller 104 may include a ATtiny13A controller chip manufactured by Microchip Technology. However, other functionally equivalent chips or processor units may be used. The controller 104 is configured (i.e., programmed) to monitor voltage and/or resistance between the two heat-resistant, electroconductive wires 110 and 112 provided with resistor 120 and, based on whether the sensed voltage and/or resistance between the two heat-resistant, electroconductive wires 110 and 112 provided with resistor 120 falls outside predetermined or selected setpoint range(s), to activate or trigger the alarm 114. As shown in FIG. 6, the alarm system 100 may further comprise a relay 126 to activate or trigger the alarm.

The ATtiny13 controller chip is known as a high-performance and low power technology product that features an 8-bit AVR RISC architecture-based microcontroller unit having 8 pins, out of which 6 pins can be used as I/O pins. It has a powerful instruction architecture that provides a processing speed of 1 MIPS (million instructions per second) per MHz while balancing power consumption at the same time. The speed could reach up to 20 MIPS if 20 MHz max frequency is used.

As shown in FIG. 6, the 8 pins on the ATtiny13 controller microchip are wired as follows:
- Pin 1 [output]—Output voltage/current to electrically conductive wire 112. This pin constitutes a control pin, which allows to test resistant value of the resistance inherent in the heat-resistant wires 110, 112 plus the fixed resistance provided by resistor 120.
- Pin 2 [input]—Input voltage, measured at an intermediate electrical point between the fixed resistor 120 and the adjustable resistor 122.
- Pin 3 [input]—Input current from the adjustable resistor 122.
- Pin 4—Ground pin.
- Pin 5 [output]—If current or resistance falls out of range, pin 5 will go high and trip the relay 126, which in turn triggers the alarm 114.
- Pin 6—not used.
- Pin 7—not used.
- Pin 8—5 volts in, supplied by the battery 116 via a voltage regulator 128.

As may be seen in FIG. 6, the voltage from the battery 116 of the automobile 102 may be regulated by voltage regulator 128 from 12 V to a target voltage of 5 V to power the printed circuit board including the ATtiny13 controller microchip, indicated at 124. Thus, the step-down voltage regulator can allow all components to operate at 5 V, except the alarm (siren or speaker 114), which can operate at 12 V.

Additionally, as shown in FIG. 6, a fuse 130 may be provided between the positive terminal of the 12 V (IN) and the rest of the circuit to protect the circuit.

The resistor 120 provided at one end of the heat-resistant, electroconductive wires 110 and 112 to monitor tampering, as shown in FIG. 6, may, for example, be a ¼ watt~1K ohm resistor. Resistors with other ratings may also be suitable.

Figure 3:
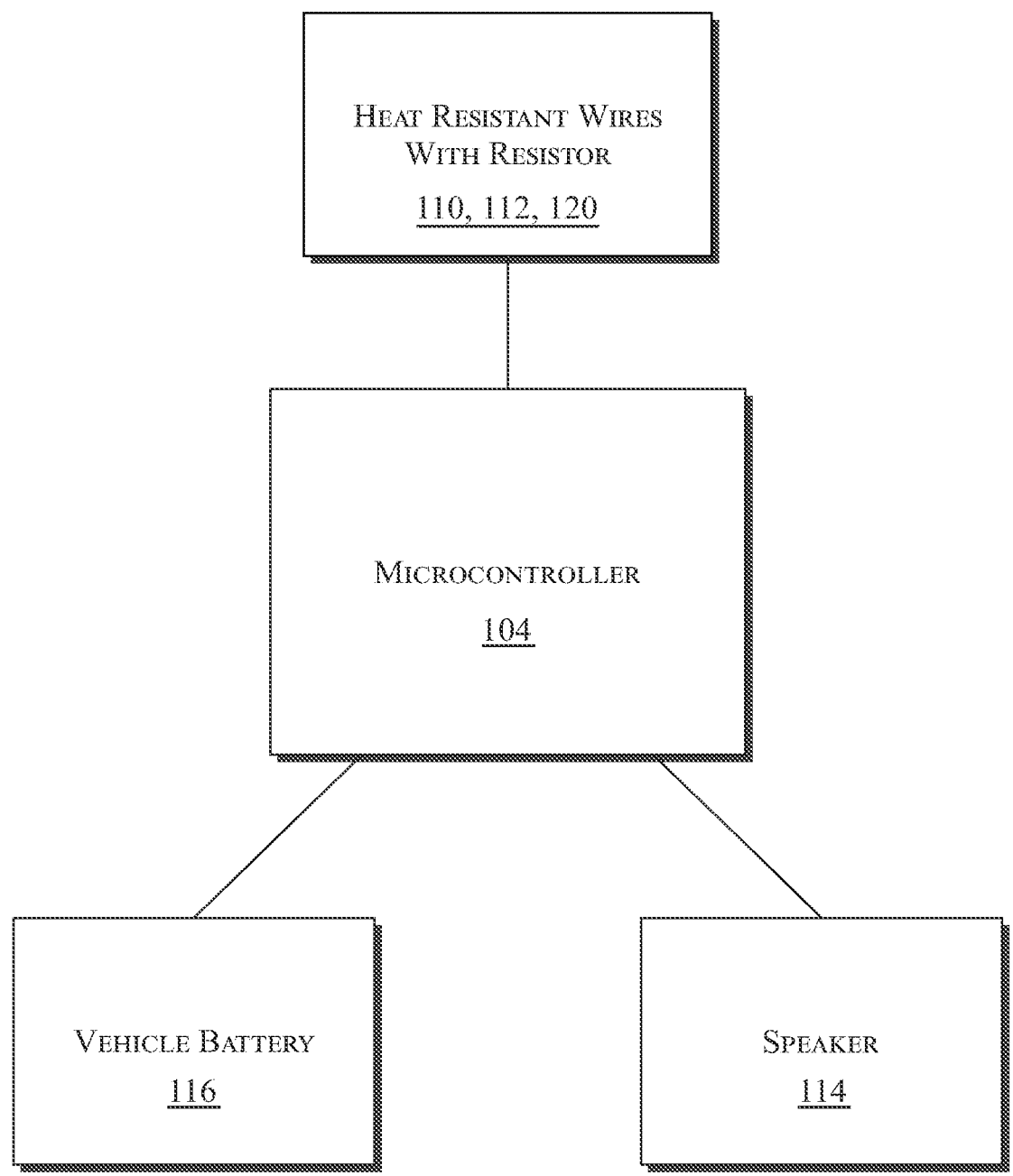
FIG. 3 presents a block diagram system configuration of the catalytic converter alarm system according to an embodiment of the present invention.

The illustration of FIG. 3 is a simplified block diagram illustrating the configuration of the alarm system 100. The alarm system 100 includes controller (microcontroller) 104, heat-resistant wires 110 and 112 provided with resistor 120, and alarm (speaker) 114.

Figure 4:
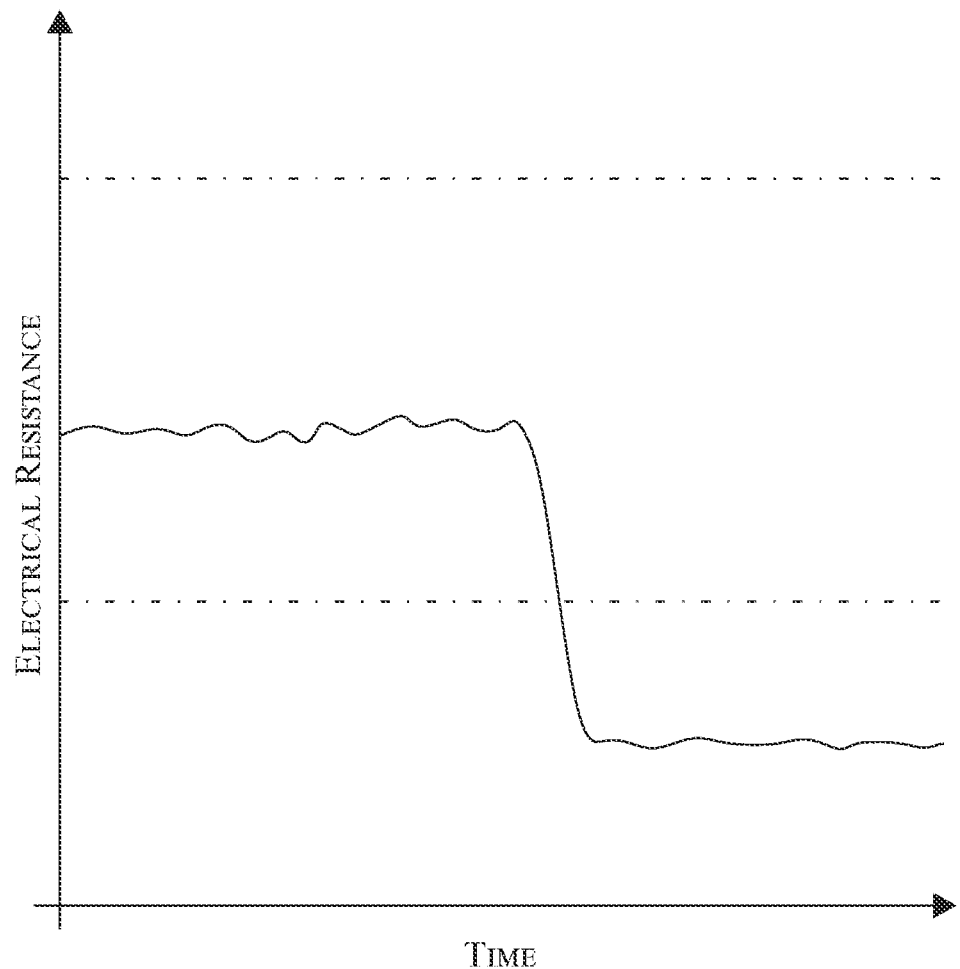
FIG. 4 presents a resistance versus time graph showing a sharp drop in resistance sensed by the controller in the printed circuit board of the catalytic converter alarm system according to an embodiment of the invention when the heat-resistant, electroconductive wires are tampered with by bypassing (jumping) the wires.

The illustration of FIG. 4 shows a typical graph of the monitored resistance across the heat-resistant, electroconductive wires 110 and 112 and resistor 120 over time, showing a sharp drop-off when the alarm system 100 is tampered with by unauthorized personnel.

Figure 5:
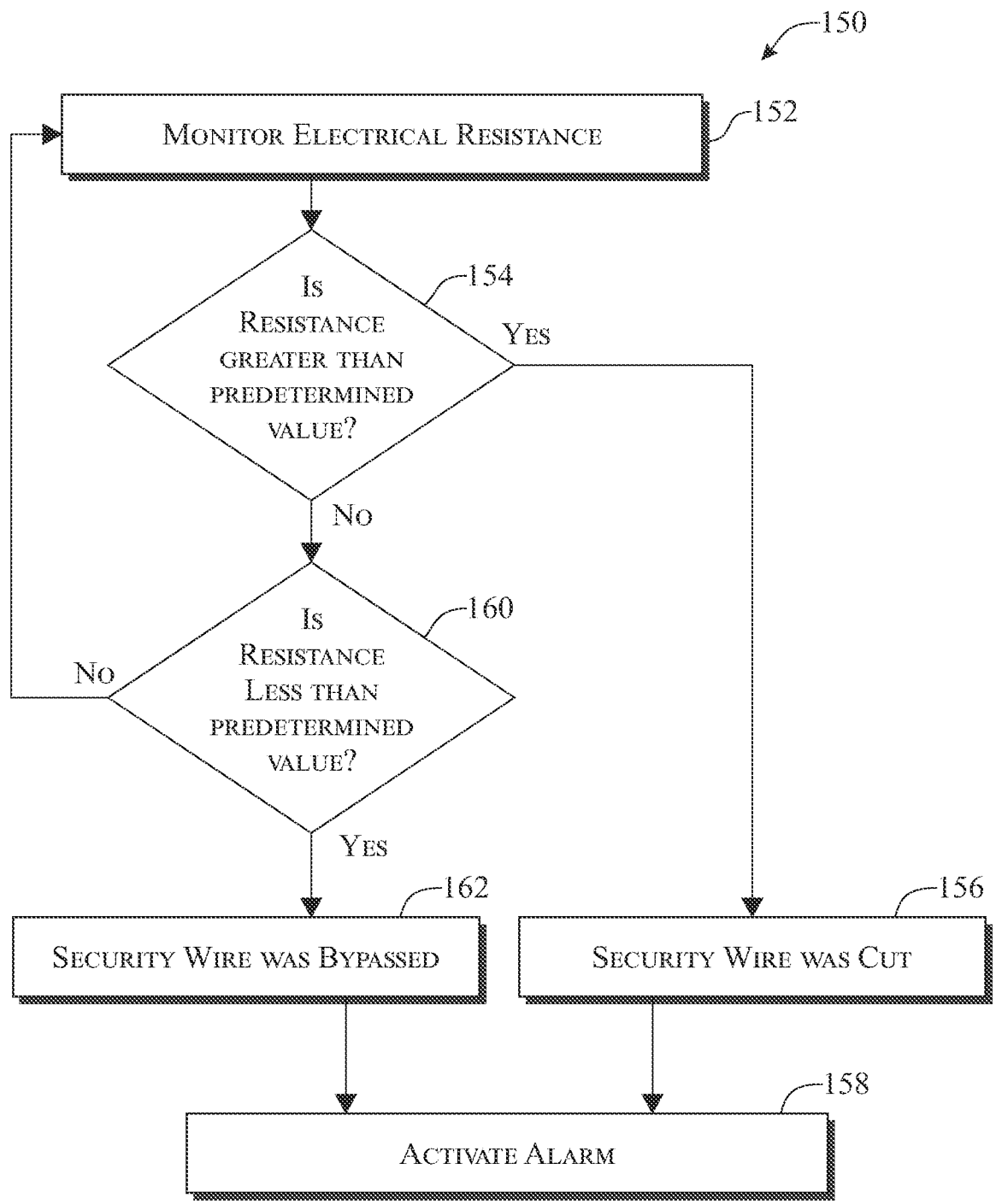
FIG. 5 presents an algorithm for the programming logic of a controller for the catalytic converter alarm system in accordance with an embodiment of the present invention.

The illustration of FIG. 5 shows an algorithm or method 150 according to an embodiment of the present invention. The electrical resistance across the heat-resistant, electroconductive wires 110 and 112 and resistor 120 is monitored at step 152. When the sensed resistance is greater than a first predetermined value at a checking step 154, the controller 104 determines, at step 156, that the heat-resistant, electroconductive wires 110 and 112 have been cut or open-circuited, and the alarm 114 is responsively activated at step 158. If the sensed resistance is lower than the first predetermined value at step 154, then the controller 104 determines whether the sensed resistance is lower than a second predetermined value at step 160, the second predetermined value lower than the first predetermined value. If the sensed resistance is lower than the second predetermined value, at step 162 the controller 104 determines that the heat-resistant, electroconductive wires 110 and 112 have been bypassed or short-circuited, and the alarm 114 is responsively activated at step 158. If not, the alarm system 100 continues operating under normal condition and monitoring of the resistance is continued at step 152.

Although the alarm system 100 is shown to protect a catalytic converter 106, a person skilled in the art in possession with the inventor's disclosure would appreciate that the alarm system can be implemented on valuable components other than solely a catalytic converter.

Figure 7:
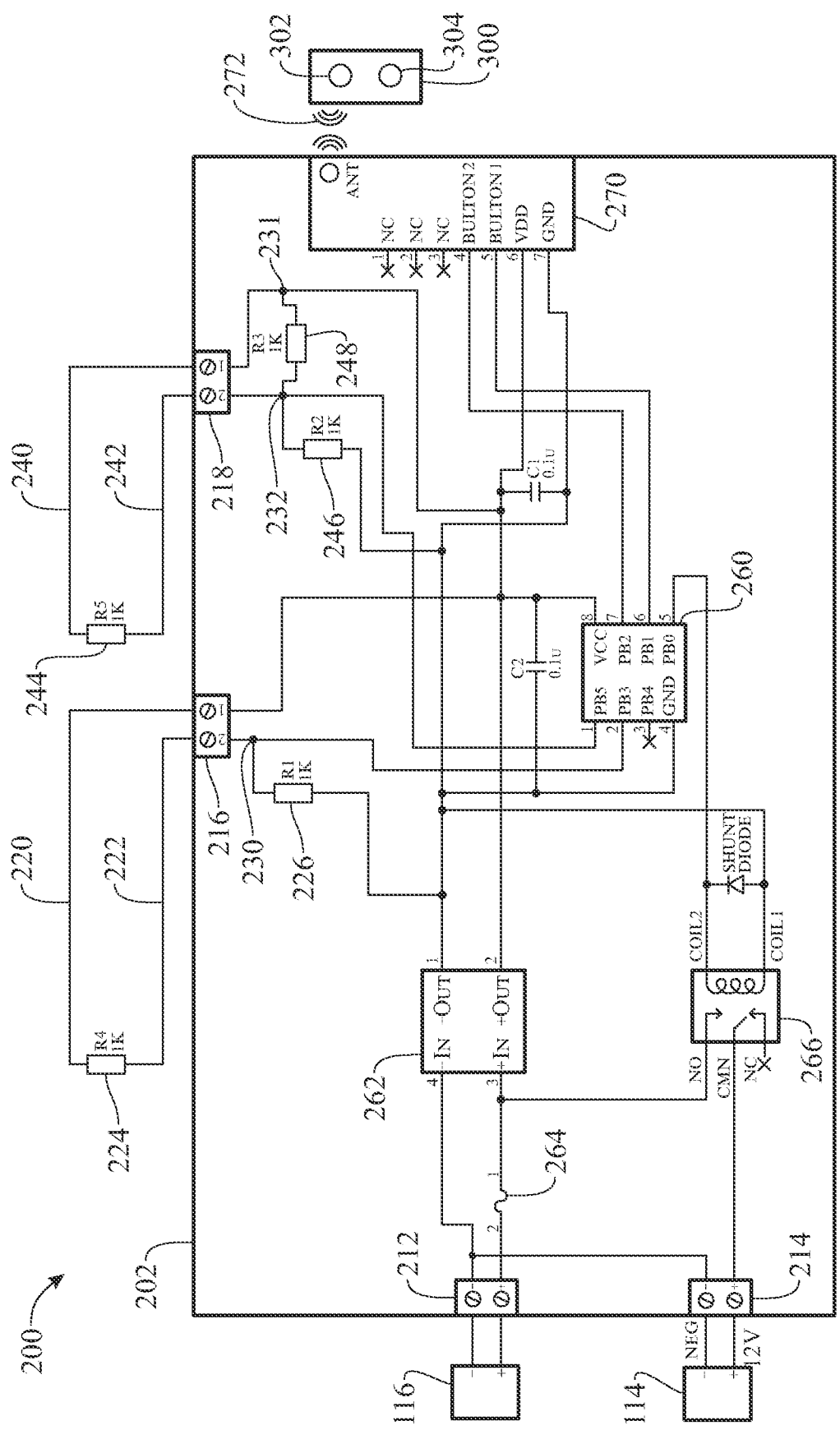
FIG. 7 presents an electrical schematic of a catalytic converter alarm system in accordance with a further embodiment of the present invention.

The illustration of FIG. 7 shows an alarm system 200 in accordance with a further embodiment of the present invention. Similarly to the previous embodiment, the alarm system 200 of the present embodiment is configured to monitor valuable parts of a vehicle, such as a catalytic converter and associated piping, or other applicable parts, components, etc. The alarm system 200 includes a controller 210 configured to monitor an electrical signal on a first pair of electrically conductive wires 220, 222, configured to be arranged at, and preferably extend along and wrap around to, a catalytic converter or other applicable part or structure, similarly to the previous embodiment. Additionally, the alarm system 200 of the present embodiment may further include a second pair of electrically conductive wires 240, 242 configured to be arranged at, and preferably extend along and wrap around to, a second catalytic converter or other applicable part or structure, similarly to the first pair of electrically conductive wires 222, 222. I.e., the alarm system 200 of the present embodiment may be selectively configured to monitor a single valuable component (e.g., a catalytic converter and associated exhaust system piping of a single-exhaust vehicle) or two valuable components (e.g., two catalytic converters and respective exhaust system piping in a dual-exhaust vehicle).

Similarly to the previous embodiment, the controller 210 of the alarm system 200 may include a chip or processor unit 260, a voltage regulator 262, a fuse 264 and a relay 266. In some embodiments, the controller 210 may further include a wireless receiver 270, for purposes described hereinafter. In some embodiments, the controller 210 may be implemented on one or more printed circuit boards (PCB). Alternatively or additionally, the controller 210 may be contained, and preferably encapsulated or enclosed, within a housing 202. In some embodiments, the processor unit 260 may include a memory adapted to store software instructions configured to cause the processor unit 260 to carry out the operations described herein.

In some embodiments, the alarm system 200 may further include a plurality of electrical connectors configured to provide an electrical interface between the controller 210 and components external to the controller 210. For example, in embodiments in which the controller 210 is received within a housing, one or more of the electrical connectors may be arranged on the housing. In embodiments in which the controller 210 is provided on one or more PCBs, one or more of the electrical connectors may be arranged on the PCB(s). In the non-limiting example shown in the drawing, the plurality of electrical connectors consists of a power source or first electrical connector 212, an alarm emitter or second electrical connector 214, a third electrical connector 216, and a fourth electrical connector 218, wherein each of these four electrical connectors comprises a respective pair of electrical contacts or terminals.

Similarly to the previous embodiment, the controller 210 is electrically powered by an external power source, such as an onboard battery of a vehicle for which one or more catalytic converters (or other valuable components) are being monitored by the alarm system 200. As shown, the first electrical connector 212 is connected (preferably disconnectably) to battery 116, and more specifically, positive and negative terminals of the battery 116 are electrically connected to the positive and negative terminals of the first electrical connector 212, respectively, which in turn are electrically connected to positive and negative input terminals of the voltage regulator 262. It should be noted that the fuse 264 is provided between the positive terminal of the first electrical connector 212 and the positive input terminal of the voltage regulator 262 to protect the controller 210, as was heretofore described with reference to the fuse 130 of the previous embodiment. The voltage regulator 262 may convert the available battery voltage (e.g., 12 VDC) to a different, operation voltage (e.g., 5 VDC) configured to power the controller 210, such that said different voltage (e.g., 5 VDC) is provided at a positive output terminal of the voltage regulator 262 with respect to a negative output terminal of the voltage regulator 262. For simplicity, the operation or nominal voltage produced by the voltage regulator 262 at its positive output terminal is hereinafter referred to generally as 5 VDC or "Vin"); however, this is not to be understood as limiting and alternative embodiments are contemplated in which the operation or nominal voltage may be other than 5 VDC. In a non-limiting example, the voltage regulator 262 may be a Mini360 chip.

Further similarly to the previous embodiment, the controller 210 is configured to generate an alarm, such as an audible and/or visible alarm, at an alarm emitter 114, responsively to the controller 210 detecting an anomaly at the catalytic converters or other valuable components being monitored by the controller 210. The alarm emitter 114 is connected, preferably disconnectably, to the second electrical connector 214. As with the previous embodiment, the alarm is triggered by relay 266. As shown, a normally-open contact of the relay 266 is connected to the vehicle battery positive voltage (via the fuse 264) while a normally-closed contact of the relay 266 is grounded; in turn, a common terminal of the relay 266 is connected to the positive terminal of the second electrical connector 214, the negative terminal of which is connected to the battery negative terminal via the first electrical connector 212. As such, the alarm emitter 114, via the second electrical connector 214, is normally provided with 0 Volts by the relay 266, unless an anomaly is detected as will be described hereinafter.

As mentioned heretofore, the alarm system 200 of the present embodiment is configured to monitor a first catalytic converter or other valuable component via a first pair of electrically conductive wires 220, 222 and, optionally, a second catalytic converter or other valuable component via a second pair of electrically conductive wires 220, 222. As with the previous embodiment, the first pair of electrically conductive wires 220, 222 may extend from the controller 210 along the vehicle and wind around, such as in a criss-crossed arrangement as heretofore described, a corresponding catalytic converter 106 and associated tubing 108, or other valuable part; respective near ends of the first pair of electrically conductive wires 220, 222 may be connected (preferably disconnectably) to first and second terminals "1" and "2", respectively, of the third electrical connector 216, while a resistor 224 may be electrically connected between respective far ends of the first pair of electrically conductive wires 220, 222. Similarly, if present, the second pair of electrically conductive wires 240, 242 may extend from the controller 210 along the vehicle and may wind around, such as In a criss-crossed arrangement as heretofore described, a corresponding second catalytic converter 106 and associated tubing 108, or other valuable part; respective near ends of the second pair of electrically conductive wires 240, 242 may be connected (preferably disconnectably) to first and second terminals "1" and "2", respectively, of the fourth electrical connector 218, and a resistor 244 may be electrically connected between respective far ends of the second pair of electrically conductive wires 240, 242. The resistance of resistor 224 and the resistance of resistor 244 may be 1K ohm, for instance and without limitation. For purposes that will be described hereinafter, the controller 210 may further include a bypass resistor 248 electrically connected between the first and second terminals "1" and "2" of the fourth electrical connector 218, and more specifically, between first and second electrical points 231 and 232 at the first and second terminals "1" and "2" of the fourth electrical connector 218, respectively; the resistance of the bypass resistor 248 is preferably the same as that of resistor 244 (e.g., 1K ohm). In some embodiments, the bypass resistor 248 may come initially installed in the controller 210 (e.g., initially mounted to the PCB), and is to be maintained in place or otherwise removed in dependence of whether the alarm system 200 is to monitor a single valuable component or two valuable components, respectively, as will be described hereinafter.

The wireless receiver 270 may be configured to wirelessly communicate with a remote control device 300, via a wireless (e.g., radiofrequency) link 272. In a non-limiting example of the invention, the wireless receiver 270 may be a KSL-RX480E-4 chip. In turn, non-limiting examples of the remote control device 300 may include, without limitation, an electronic key fob, a smartphone or other portable electronic device, a computer, and a server. The remote control device 300 may include a user interface (UI), enabling a user to send commands and/or receive feedback from the controller 210 via the wireless receiver 270 and the wireless link 272. In some embodiments, the remote control device 300 may include at least one user-operable control (e.g., depressible button, tactile button or portion of a tactile screen), such as a first user-operable control 302 and a second user-operable control 304, respectively. The wireless receiver 270 may include a "Button 1" terminal and a "Button 2" terminal. The "Button 1" terminal of the wireless receiver 270 may be configured to energize responsively to a signaling via the wireless link 272 of a user operation of the first user-operable control 302 on the remote control device 300. In turn, the "Button 2" terminal may be configured to energize responsively to a signaling via the wireless link 272 of a user operation of the second user-operable control 304 of the remote control device 300.

With reference to the processor unit 260, in a non-limiting example of the invention, the processor unit 260 may be an ATTiny85 microcontroller chip manufactured by Microchip Technology, or an equivalent. This chip includes eight (8) pins, of which Pin3 is not used in the present embodiment and the remaining seven (7) pins are wired as follows.

Pin8 of the processor unit 260 may connect to 5 VDC from the positive output terminal of the voltage regulator 262. It should be noted that the positive output terminal of the voltage regulator 262 may be further connected, and thus provide 5 VDC to the first terminal "1" of the third electrical connector 216 (said first terminal "1" configured to be connected to electrically conductive wire 220), the first terminal "1" of the fourth electrical connector 218 (said first terminal "1" configured to be connected to electrically conductive wire 240), and to a power-input terminal "VDD" of the wireless receiver 270 (to power the wireless receiver 270 for operation). In some embodiments or applications, and more particularly, in embodiments or applications in which a single catalytic converter or valuable item is to be monitored, 5 VDC is further provided to the bypass resistor 248.

Pin4 of the processor unit 260 may be connected to ground (GND), i.e. to the negative output terminal of the voltage regulator 262. It should be noted that GND is further provided at secondary resistors 226 and 246, a first coil terminal "COIL1" of the relay 266, and a ground input terminal "GND" of the wireless receiver 270. As further shown, a smoothing capacitor is provided between Pin4 and Pin8 of the processor unit 260, and a second smoothing capacitor is provided between the power-input terminal "VDD" and the ground input terminal "GND" of the wireless receiver 270.

Pin6 and Pin7 of the processor unit 260 may be connected to the "Button 1" terminal and the "Button 2" terminal of the remote receiver 270, respectively, allowing the processor unit 260 to be informed of user operation of either one of the first and second user-operable controls 302 and 304 of the remote control device 300.

Pin2 of the processor unit 260 connects to an electrical point 230 at, or connected to, the second terminal "2" of the third electrical connector 216, and thus connected to the electrically conductive wire 222 when the electrically conductive wire 222 is connected to the third electrical connector 216. Said electrical point 230 is further connected to the secondary resistor 226. By means of Pin2, the processor unit 260 may measure the voltage at this electrical point 230, to determine whether or not an anomaly is present at the first catalytic converter or other valuable item being monitored through the first pair of electrically conductive wires 220, 222 and the corresponding resistor 224.

Pin1 of the processor unit 260 connects to the electrical point 232 at, or connected to, the second terminal "2" of the fourth electrical connector 218, and is thus either connected to the electrically conductive wire 242 when the electrically conductive wire 242 is connected to the fourth electrical connector 218, or to the bypass resistor 248 (if present). By means of Pin1, the processor unit 260 may measure the voltage at this electrical point 232, to determine whether or not an anomaly is present at the second catalytic converter or other valuable item being monitored through the second pair of electrically conductive wires 240, 242 and the corresponding resistor 244.

Finally, Pin5 of the processor unit 260 is connected to a second coil terminal ("COIL2") of the relay 266, with a shunt diode being arranged between the "COIL1" and "COIL2" terminals of the relay 266. Through Pin5, the processor unit 260 provides an alarm command or signal directed to the alarm emitter 114, in the event of an anomaly at the first catalytic converter or other valuable item being monitored through the first pair of electrically conductive wires 220, 222 and the corresponding resistor 224, or, when applicable, the second catalytic converter or other valuable item being monitored through the second pair of electrically conductive wires 240, 242 and the corresponding resistor 244.

Operation of the alarm system 200 is now described with reference primarily to FIGS. 1, 5 and 6. Initially, the alarm system 200 is selectively adjusted to a dual-circuit configuration, in which the alarm system 200 is configured to monitor a pair of catalytic converters or a valuable items, or to a single-circuit configuration, in which the alarm system 200 is configured to monitor a single catalytic converter or other valuable item. Each one of these configurations is described hereinafter.

With reference initially to the dual-circuit configuration, the bypass resistor 248, which may be initially provided in the alarm system 200 between electrical points 231 and 232, may be removed from the controller 210; this step may be carried out, in preferred embodiments, by a manufacturer or installer of the alarm system 200, or by a vehicle manufacturer. In some embodiments, the secondary resistors 226 and 246 mounted in the controller 210 may each be selected from a group of resistors having different resistances, such as ranging between 500 ohms and 2K ohms, preferably during manufacture or installation of the alarm system 200. A resistor 224 may be mounted to far ends of the first pair of electrical wires 220 and 222 as heretofore described, preferably by the installer of the alarm system 200, with the resistor 224 being preferably selected such that its resistance is equal to the resistance of the secondary resistor 226 of the controller 210. Similarly, a resistor 244 may be mounted to far ends of the second pair of electrical wires 240 and 242 as heretofore described, also preferably by the installer of the alarm system 200, with the resistor 244 being preferably selected such that its resistance is equal to the resistance of the secondary resistor 246 of the controller 210.

The first pair of electrically conductive wires 220, 222 may be mounted over and along a first valuable item, such as a first catalytic converter and engine exhaust tubing of a dual-exhaust vehicle, preferably in a wrapped-around and criss-crossed arrangement and optionally secured by silver duct tape, locking hose clamps, and/or other fastener(s), as described with reference to the previous embodiment. The second pair of electrically conductive wires 240, 242 may be mounted over and along a second valuable item, such as a second catalytic converter and engine exhaust tubing of the same dual-exhaust vehicle, also preferably in a wrapped-around and criss-crossed arrangement and optionally secured by tape or other fasteners, as described with reference to the previous embodiment.

The first pair of electrically conductive wires 220, 222 and the second pair of electrical wires 240, 242 may then be electrically connected to the third and fourth electrical connectors 216 and 218 of the alarm system 200 as heretofore described. Consequently, a first detection circuit is formed from Pin8 (5 VDC) of the processor unit 260 to Pin4 (GND) of the processor unit 260, the first detection circuit comprising resistors 224 and 226 arranged in series, where electrical point 230 is provided between the two serial resistors 224 and 226. Analogously, a second detection circuit is formed from Pin8 (5 VDC) of the processor unit 260 to Pin4 (GND) of the processor unit 260, the second detection circuit comprising resistors 244 and 246 arranged in series, where electrical point 232 is provided between the two serial resistors 244 and 246 (as noted above, bypass resistor 248 is not present in this configuration).

Additionally, the vehicle battery 116 and alarm emitter 114 may be electrically connected to the first and second electrical connectors 212 and 214 of the alarm system 200, respectively, as heretofore described. The alarm system 200 is thus provided operating power (referred to generally as 5 VDC as mentioned heretofore) by the voltage regulator 262, and is prepared to deliver an alarm signal to the alarm emitter 114 via the relay 266.

In operation, as was heretofore described with reference to FIG. 5 and the previous embodiment, at step 152, the processor unit 260 may continuously monitor the first detection circuit, and thereby the first catalytic converter or valuable item) via Pin2 of the processor unit 260, and measure or sense a resistance value (R1) between the first pair of electrical wires 220, 222. The measurement or sensing of the resistance value (R1) between the far ends of the first pair of electrical wires 220, 222 may be carried out by the processor unit 260 as follows: at Pin2 of the processor unit 260, the processor unit 260 may obtain the voltage at the electrical point 230, which is equal to the voltage at the known, secondary resistor 226, and is hereinafter referred to as V_ref_1; the processor unit 260 may then calculate the resistance value (R1) between the first pair of electrical wires 220, 222 as R1=R_ref_1*V_ref_1/(Vin−V_ref 1), where R_ref_1 is the resistance value of secondary resistor 226, and Vin is, in this embodiment and as heretofore described, equal to 5 VDC. In normal operating conditions, the calculated resistance value (R1) should be generally equal to the predetermined, known value of resistor 224, which in turn is preferably equal to the resistance of the secondary resistor 226, as described heretofore. However, similarly to the previous embodiment and as heretofore described with reference to FIG. 5, should the processor unit 260 measure or sense a resistance value (R1) greater than a first predetermined threshold or value at step 154 (which may indicate that at least one of the first pair of electrical wires 220, 222 was cut or open-circuited) or less than a second predetermined threshold or value at step 160 (which may indicate that the first pair of electrical wires 220, 222 has been bypassed or short-circuited), the processor unit 260 concludes, at step 156 or step 162, respectively, that an anomaly is present at the first detection circuit and responsively activates the alarm at step 158. Activation of the alarm is carried out by the processor unit 260 energizing its Pin5, which is connected to the relay 266. The first and second predetermined values are greater than and less than the resistance of the resistor 224, respectively, and more preferably, indicative of an open-circuit condition or short-circuit condition, respectively, as mentioned above. In a non-limiting example, such as in an embodiment in which resistor 224 has a resistance ranging between 500 ohms and 2K ohms, the first predetermined value may be about 900K ohm, and the second predetermined value may be about 0.1K ohm.

Similarly, the processor unit 260 may also continuously monitor the second detection circuit, and thereby the second catalytic converter or valuable item, via Pin1 of the processor unit 260, in order to measure or sense a resistance value (R2) between the second pair of electrical wires 240, 242. The measurement or sensing of the resistance value (R2) between the far ends of the second pair of electrical wires 240, 242, at step 152 (FIG. 5), may be carried out by the processor unit 260 as follows: at Pin1 of the processor unit 260, the processor unit 260 may obtain the voltage at the electrical point 232, which is equal to the voltage at the known, secondary resistor 246, and is hereinafter referred to as V_ref 2; the processor unit 260 may then calculate the resistance value (R2) between the second pair of electrical wires 240, 242 as R2=R_ref_2*V_ref 2/(Vin−V_ref_2), where R_ref 2 is the resistance value of secondary resistor 246, and Vin is, in this embodiment and as heretofore described, equal to 5 VDC. In normal operating conditions, the calculated resistance value (R2) should be generally equal to the predetermined, known value of resistor 244, which in turn is preferably equal to the resistance of the secondary resistor 246, as described heretofore. However, as was heretofore described with respect to the first detection circuit, should the processor unit 260 measure or sense a resistance value (R2) greater than a first predetermined threshold or value at step 154 (which may indicate that at least one of the second pair of electrical wires 240, 242 was cut) or less than a second predetermined threshold or value at step 160 (which may indicate that the second pair of electrical wires 240, 242 has been bypassed), the processor unit 260 concludes, at step 156 or step 162, respectively, that an anomaly is present at the second detection circuit and energizes Pin5 of the processor unit 260 and activates the alarm at step 158 by energizing Pin5 of the processor unit 260. The first and second predetermined values are greater than and less than the resistance of the resistor 244, respectively, and more preferably, indicative of an open-circuit condition or short-circuit condition, respectively, as mentioned above. In a non-limiting example, such as in an embodiment in which resistors 244 and 246 each have a resistance ranging between 500 ohms and 2K ohms, the first predetermined value may be about 900K ohm, and the second predetermined value may be about 0.1K ohm. It should be noted that, in different embodiments or configurations, the first predetermined value corresponding to the first detection circuit may be the same or different than the first predetermined value associated with the second detection circuit. Similarly, the second predetermined value corresponding to the first detection circuit may be the same or different than the second predetermined value associated to the second detection circuit.

With reference to FIG. 6, an energizing of Pin5 of the processor unit 260 resulting from an anomaly in either one of the sensed resistances (R1, R2) results in the energizing of the second coil terminal "COIL2" of the relay 266 with respect to the relay's first coil terminal "COIL1". Consequently, the relay 266 switches to connect the common or "COM" terminal to the normally-open or "NO" terminal. As a result, the 5 VDC at the normally-open or "NO" terminal are transferred to the common or "COM" terminal and thereby to the alarm emitter 114 via the positive terminal of the second electrical connector 214. This causes the alarm emitter 114 to emit an audible and/or visible alarm at step 158.

Referring now to the single-circuit configuration, monitoring of the first detection circuit to calculate resistance R1 is the same as was heretofore described with reference to the dual-circuit configuration. In turn, monitoring of the second detection circuit to calculate resistance R2 is the same, with the exception that, in the single-circuit configuration, bypass resistor 248 is used instead of the second pair of wires 240, 242 and resistor 244. As such, in embodiments in which the bypass resistor 248 comes initially mounted to the alarm system 200, the bypass resistor 248 is left in place, i.e. electrically connected to the electrical points 231 and 232; in embodiments in which the bypass resistor 248 does not come initially mounted, the bypass resistor 240 is assembled to the controller 210 in order to adjust the alarm system 200 to the single-circuit configuration. In preferred embodiments, either one of these steps is carried out during manufacture or installation of the alarm system 200.

Subsequently, similarly to the dual-circuit configuration, the first pair of electrically conductive wires 220 and 222 may be electrically connected to the third electrical connector 216, the vehicle battery 116 may be electrically connected to the first electrical connector 212, and the and alarm emitter 114 may be electrically connected to the second electrical connector 214, as heretofore described. In turn, as mentioned heretofore, no electrically conductive wires are connected to the fourth electrical connector 218. Advantageously, since the first and second terminals "1" and "2" of the fourth electrical connector 218 (and thus the electrical points 231, 232) are now connected by the bypass resistor 248, at step 152 (FIG. 5) the processor unit 260 obtains a sensed resistance R2 equal to that of the bypass resistor 248, which falls between the first and second predetermined values and therefore does not cause the processor unit 260 to trigger the alarm. Thus, the single-circuit configuration may advantageously work based on the same software instructions and adjustments as the dual-circuit configuration, and requiring a simple hardware adjustment consisting in mounting the bypass resistor 246 instead of the second pair of electrically conductive wires 240, 242. Thus, the manufacturer, installer or operator does not need to adjust or modify any software or other settings in order to switch between the single-circuit and dual-circuit configurations. The calculations carried out from the voltage sensed at Pin1 of the processor unit 260, corresponding to the second detection circuit, automatically generate a "normal" (non-alarm) situation when the bypass resistor 248 is installed in the absence a second pair of electrically conductive wires 240, 242, i.e. in the single-circuit configuration, allowing the alarm system 200 to automatically remain at or return to step 152 from checking steps 154 and 160.

During operation of the alarm system 200, a user may operate the first and/or second user-operable controls 302 and 304 of the remote control device 300 to remotely operate the processor unit 260 via the wireless receiver 270. For example, in some embodiments, the processor unit 260 may be programmed or otherwise configured to switch off the alarm (by de-energizing Pin5 of the processor unit 260) responsively to operation of the first user-operable control 302. Alternatively or additionally, the processor unit 260 may be programmed or otherwise configured to reset (reset and restart the method 150 of FIG. 5 at step 152) responsively to operation of the second user-operable control 304.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claim(s) and their legal equivalents.

What is claimed is:

1. An alarm system for monitoring one or more items, comprising:
    a controller;
    one or more pairs of electroconductive wires, wherein each pair of electrically conductive wires comprises a respective, first electrically conductive wire and a respective, second electrically conductive wire, the first and second electrically conductive wires each comprising a respective, far end and a respective, near end, wherein the far ends of the first and second electrically conductive wires of each pair of electrically conductive wires are connected to each other via a respective resistor; and
    an alarm emitter, configured to emit an alarm; wherein
    the one or more pairs of electrically conductive wires are wrapped around one or more items, and the near ends of the first and second electrically conductive wires of each pair of electrically conductive wires of the one or more pairs of electrically conductive wires are operatively connected to the controller; and further wherein
    the controller is configured to execute the steps of:
        monitoring a respective resistance across said each pair of electrically conductive wires, and
        activating the alarm emitter to emit the alarm when said respective resistance is greater than a first predetermined value or less than a second predetermined value, wherein the first and second predetermined values are greater and less than the resistance of the respective resistor of said each pair of electrically conductive wires, respectively;
    wherein the controller comprises one or more secondary resistors respectively corresponding to the one or more pairs of electrically conductive wires, wherein the respective resistor of each pair of electrically conductive wires of the one or more electrically conductive wires is arranged in series with a respective secondary resistor of the one or more secondary resistors via a respective electrical point, and further wherein the step of monitoring the respective resistance comprises monitoring a voltage at said respective electrical point;
    wherein the one or more pair of electrically conductive wires comprise a first pair of electrically conductive wires and a second pair of electrically conductive wires, wherein the near ends of the first and second electrically conductive wires of the second pair of electrically conductive wires are disconnectably connected to the controller, and further wherein the alarm system is configured to adopt a working configuration in which a bypass resistor is mounted to the controller in lieu of the second pair of electrically conductive wires, with the bypass resistor arranged in series with the respective secondary resistor corresponding to the second pair of electrically conductive wires, the bypass resistor configured such that the respective resistance monitored in the monitoring step is neither greater than the first predetermined value nor less than the second predetermined value.

2. The alarm system of claim 1, wherein the first predetermined value is indicative of an open circuit at said each pair of electrically conductive wires.

3. The alarm system of claim 1, wherein the second predetermined value is indicative of a short circuit at said each pair of electrically conductive wires.

4. The alarm system of claim 1, wherein each pair of electrically conductive wires of the one or more pairs of electrically conductive wires is wrapped around said one or more items in a criss-crossed arrangement.

5. The alarm system of claim 1, further comprising one or more electrical connectors, wherein each pair of electrically conductive wires is connected to a respective electrical connector of the one or more electrical connectors and is operatively connected to the controller via said respective electrical connector.

6. The alarm system of claim 1, further comprising a power source electrical connector operatively connected to the controller, the power source electrical connector configured for the connection thereto of an external power source to provide electrical power to the controller.

7. The alarm system of claim 1, further comprising an alarm emitter electrical connector operatively connected to the controller, wherein the alarm emitter is connected to the alarm emitter electrical connector and thereby to the controller.

8. The alarm system of claim 1, further comprising a housing, wherein the controller is contained within the housing.

9. The alarm system of claim 8, wherein the controller is encapsulated within the housing.

10. The alarm system of claim 9, further comprising one or more electrical connectors at the housing, wherein each pair of electrically conductive wires is connected to a respective electrical connector of the one or more electrical connectors and is operatively connected to the controller via said respective electrical connector.

11. The alarm system of claim 9, further comprising a power source electrical connector at the housing and operatively connected to the controller, the power source electrical connector configured for the connection thereto of an external power source to provide electrical power to the controller.

12. The alarm system of claim 9, further comprising an alarm emitter electrical connector at the housing and operatively connected to the controller, wherein the alarm emitter is connected to the alarm emitter electrical connector and thereby to the controller.

13. The alarm system of claim 9, further comprising a wireless receiver configured to wirelessly communicate with a remote control device via a wireless signal link, wherein the controller is operable by the remote control device via the wireless signal link and the wireless receiver.

14. The alarm system of claim 1, wherein the one or more items comprise at least one catalytic converter of an automobile.

15. The alarm system of claim 14, wherein the one or more items further comprise a respective engine exhaust system tubing connected to each catalytic converter of the at least one catalytic converter.

16. The alarm system of claim 14, wherein the alarm emitter is concealed within the automobile and is electrically powered by a battery of the automobile.

17. An alarm system for monitoring one or more items, comprising:
    a controller;
    one or more pairs of electroconductive wires, wherein each pair of electrically conductive wires comprises a respective, first electrically conductive wire and a respective, second electrically conductive wire, the first and second electrically conductive wires each comprising a respective, far end and a respective, near end, wherein the far ends of the first and second electrically conductive wires of each pair of electrically conductive wires are connected to each other via a respective resistor; and an alarm emitter, configured to emit an alarm; wherein the one or more pairs of electrically conductive wires are wrapped around one or more items in a criss-crossed arrangement, and the near ends of the first and second electrically conductive wires of each pair of electrically conductive wires of the one or more pairs of electrically conductive wires are operatively connected to the controller; and further wherein the controller is configured to execute the steps of:
  monitoring a respective resistance across said each pair of electrically conductive wires, and
  activating the alarm emitter to emit the alarm when said respective resistance is greater than a first predetermined value or less than a second predetermined value, wherein the first and second predetermined values are greater and less than the resistance of the respective resistor of said each pair of electrically conductive wires, respectively, and further wherein the first predetermined value is indicative of an open circuit at said each pair of electrically conductive wires, and the second predetermined value is indicative of a short circuit at said each pair of electrically conductive wires;

wherein the controller comprises one or more secondary resistors respectively corresponding to the one or more pairs of electrically conductive wires, wherein the respective resistor of each pair of electrically conductive wires of the one or more electrically conductive wires is arranged in series with a respective secondary resistor of the one or more secondary resistors via a respective electrical point, and further wherein the step of monitoring the respective resistance comprises monitoring a voltage at said respective electrical point;

wherein the one or more pair of electrically conductive wires comprise a first pair of electrically conductive wires and a second pair of electrically conductive wires, wherein the near ends of the first and second electrically conductive wires of the second pair of electrically conductive wires are disconnectably connected to the controller, and further wherein the alarm system is configured to adopt a working configuration in which a bypass resistor is mounted to the controller in lieu of the second pair of electrically conductive wires, with the bypass resistor arranged in series with the respective secondary resistor corresponding to the second pair of electrically conductive wires, the bypass resistor configured such that the respective resistance monitored in the monitoring step is neither greater than the first predetermined value nor less than the second predetermined value.

* * * * *